(No Model.) 2 Sheets—Sheet 1.
S. K. TURNER.
PLANTER.

No. 501,385. Patented July 11, 1893.

Witnesses
Geo. E. Freeks
Roland A. Fitzgerald

Inventor
S. K. Turner
By Lehmann Pattison & Nesbit
attys (No Model.) 2 Sheets—Sheet 2.
S. K. TURNER.
PLANTER.
No. 501,385. Patented July 11, 1893.
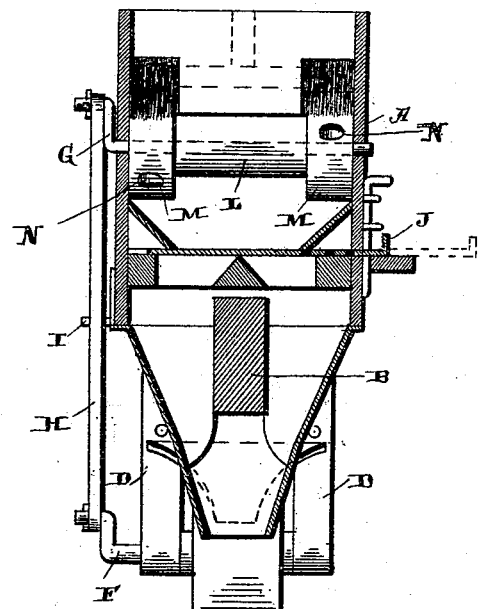
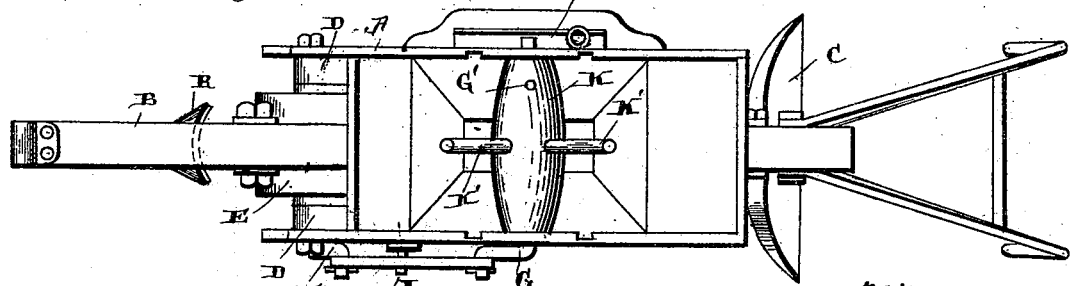
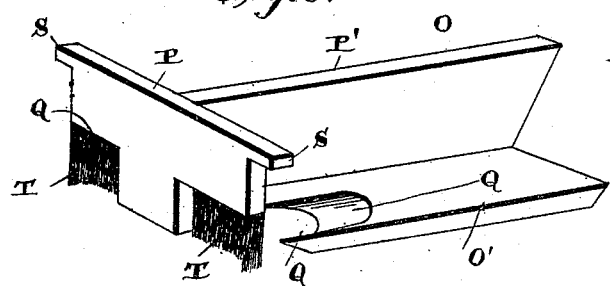
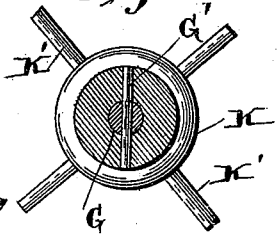

UNITED STATES PATENT OFFICE.

SAMUEL K. TURNER, OF ETHEL, MISSISSIPPI.

PLANTER.

SPECIFICATION forming part of Letters Patent No. 501,385, dated July 11, 1893.

Application filed March 2, 1893. Serial No. 464,435. (No model.)

*To all whom it may concern:*

Be it known that I, SAMUEL K. TURNER, of Ethel, in the county of Attala and State of Mississippi, have invented certain new and useful Improvements in Planters; and I do hereby declare the following to be a full, clear, and exact description of the invention, such as will enable others skilled in the art to which it pertains to make and use it, reference being had to the accompanying drawings, which form part of this specification.

My invention relates to an improvement in planters; and it consists in the novel features of construction and in the novel combination and arrangement of parts which will be fully decribed hereinafter and especially referred to in the claim.

The object of my invention is to provide a machine which may be used for planting either cotton or corn and other small seeds, and which while planting the latter will drop fertilizer therewith into the furrow.

Figure 1:
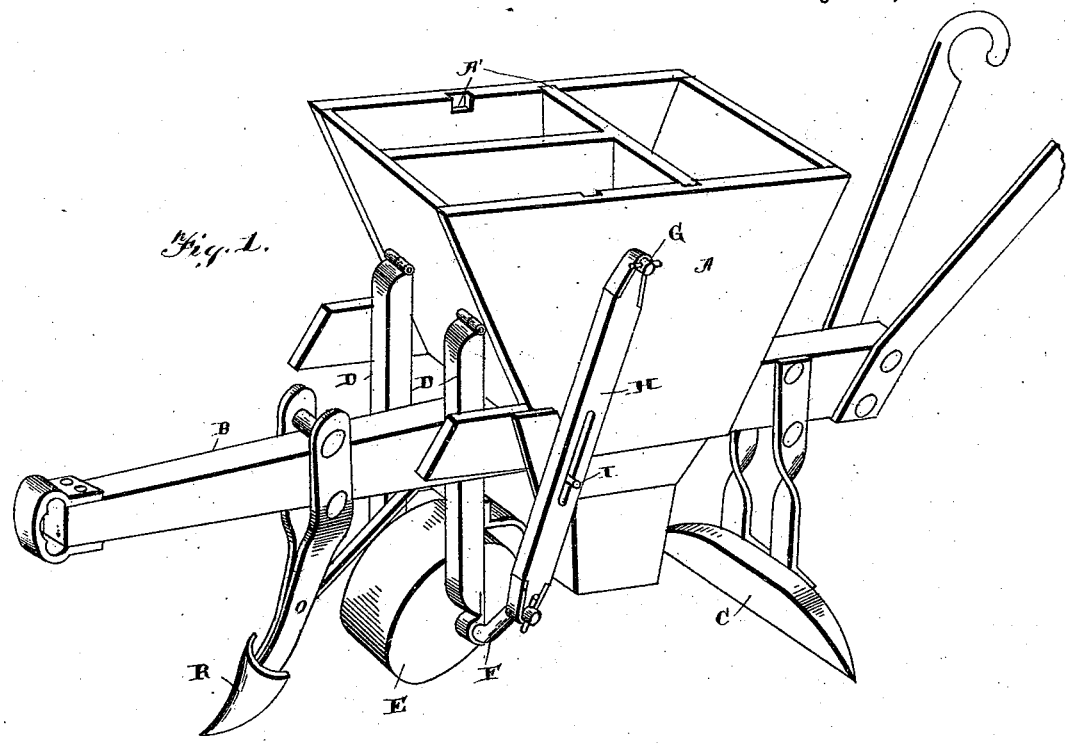
Figure 2:
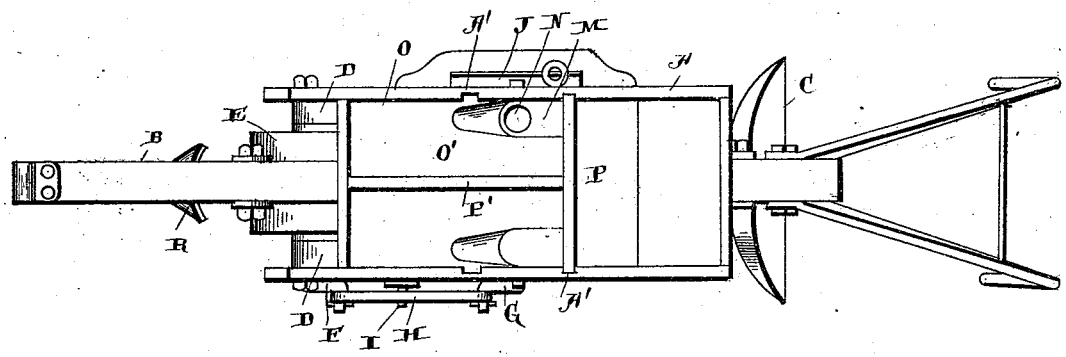

Referring to the accompanying drawings,— Figure 1 is a perspective view of my improved planter. Fig. 2 is a plan view of the same. Fig. 3 is a vertical cross sectional view of Fig. 4. Fig. 4 is a plan view of the hopper when adjusted for cotton planting. Fig. 5 is a detached perspective view of the removable hopper. Fig. 6 is a cross sectional view of the cotton seed agitator.

A, designates the main hopper and extending longitudinally through its lower portion is the beam B, of an ordinary plow which serves to support the planter. A furrow closer C, is clamped to the beam behind the hopper and by connecting the hopper therewith as shown the latter is held firmly in place. Depending from the forward end of the hopper and upon opposite sides of the beam are the vertical standards D, and journaled between their lower ends is the drive wheel E, mounted on a crank shaft F. Extending transversely through the hopper A, is the crank shaft G and connecting the cranks of the shafts F and G, is the longitudinally slotted rod H. A pin I, projects from the hopper side into the slot of the rod and thus forms a fulcrum point upon which the said rod moves and turns when following the movements of the said crank shafts. The hopper bottom is formed immediately above the beam B, and the discharge opening thereof is controlled by the laterally movable slide J which is adjustable across the same from the outer side of the hopper. The shaft G, is removable and for planting cotton I place thereon the agitator hub K, carrying projecting teeth K′, the former being held in place by pin G′ extending therethrough and through the shaft G.

For planting corn, peas or other small seeds as well as dropping fertilizer the above described agitator is removed and the roller L, placed thereon and secured by pin G′, as shown in Fig. 3. The ends of this roller are enlarged as at M, and formed in the peripheries of these enlarged portions are recesses N. Removably secured in the main hopper is the hopper O, consisting of the bottom O′, and the vertical right angle walls P and P′, the latter separating the compartments of the removable hopper while the former forms the end wall of the same. The forward corners of the bottom O′, as well as the under edge of the wall P are cut away as shown at Q, and the hopper O, fits within the main hopper in such a manner that the enlarged recessed portions M, of the roller project thereinto. It will be readily understood that as the roller is revolved it will carry seed from the compartments and drop the same into the main hopper from which it will drop into the furrow which is opened by tooth R, at the forward end of the beam. The compartments may be used at the same time for different kinds of seed which it is desired to plant together or one compartment may contain the seed while the other contains the fertilizer. The top edges of the main hopper are recessed at A′ to let in the projecting ears S, of the removable hopper. It will be seen that two sets of notches A′, are formed so that the removable hopper may be placed in either end of the main hopper. Brushes T depend from the front wall P, and bear on the rollers M, thus keeping them free from deposit and preventing more seed from feeding from the compartments than is contained in the recesses N.

By means of the devices herein shown and described it will be seen that I have constructed a planter which may be mounted on an ordinary plow beam and effectually operated therefrom and which is well adapted for planting cotton, corn or other seed as well as dropping fertilizer.

Having thus fully described my invention, what I claim as new, and desire to secure by Letters Patent, is—

The combination, in a planter, of a main hopper, a shaft extending therethrough, roller L, thereon having enlarged ends M, which are recessed, and a partitioned hopper within the main hopper and which is recessed at its end to fit over the said enlarged ends of the roller, substantially as shown and described.

In testimony whereof I affix my signature in presence of two witnesses.

S. K. TURNER.

Witnesses:
M. M. HULL,
G. R. CONNER.